(12) United States Patent
Kitamura et al.

(10) Patent No.: US 9,233,512 B2
(45) Date of Patent: Jan. 12, 2016

(54) MANUFACTURING METHOD OF BLAZED DIFFRACTION GRATING AND MOLD FOR MAKING A BLAZED DIFRACTION GRATING

(75) Inventors: Tsuyoshi Kitamura, Utsunomiya (JP); Takashi Sukegawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 51 days.

(21) Appl. No.: 13/414,824

(22) Filed: Mar. 8, 2012

(65) Prior Publication Data

US 2012/0229904 A1    Sep. 13, 2012

(30) Foreign Application Priority Data

Mar. 10, 2011   (JP) ................................. 2011-052933

(51) Int. Cl.
| | | |
|---|---|---|
| *G02B 5/18* | (2006.01) | |
| *B29D 11/00* | (2006.01) | |
| *B29C 33/38* | (2006.01) | |

(52) U.S. Cl.
CPC ...... *B29D 11/00769* (2013.01); *B29C 33/3842* (2013.01); *B29D 11/0048* (2013.01); *G02B 5/1852* (2013.01); *G02B 5/1857* (2013.01); *G02B 5/1861* (2013.01); *Y10T 83/0304* (2015.04)

(58) Field of Classification Search
CPC .. G02B 5/0215; G02B 5/0221; G02B 5/1861; G02B 5/1828
USPC .......................... 359/571, 572, 566, 569, 575
See application file for complete search history.

(56) References Cited

U.S. PATENT DOCUMENTS

| | | | | |
|---|---|---|---|---|
| 4,886,341 A | * | 12/1989 | Oishi et al. | 359/575 |
| 6,067,197 A | * | 5/2000 | Blasiak et al. | 359/571 |
| 6,475,704 B1 | * | 11/2002 | Iwasaki et al. | 430/321 |
| 6,590,709 B1 | * | 7/2003 | Ori et al. | 359/566 |

(Continued)

FOREIGN PATENT DOCUMENTS

| | | | | |
|---|---|---|---|---|
| JP | 2000214315 A | | 8/2000 | |
| JP | 2002233912 A | * | 8/2002 | ............... B23D 1/00 |

(Continued)

OTHER PUBLICATIONS

English machine translation of Japanese application JP 2002233912 A.*

(Continued)

*Primary Examiner* — Thomas K Pham
*Assistant Examiner* — Nicholas R Pasko
(74) *Attorney, Agent, or Firm* — Rossi, Kimms & McDowell LLP (57) ABSTRACT

A method for manufacturing a diffraction grating having a plurality of grating grooves that extends in parallel in a direction includes a first cutting processing step of moving, in the direction, a work and a cutting tool having a first blade and a second blade relatively to each other, and of forming a first surface of the grating groove in the work through cutting processing using the first blade of the cutting tool, and a second cutting step of moving, in the direction, the work and the cutting tool relatively to each other after the first cutting processing step, so that the first blade does not contact the first surface formed by the first cutting processing step, and of forming a second surface of the grating groove in the work through cutting processing using the second blade of the cutting tool.

10 Claims, 6 Drawing Sheets

(56) References Cited

U.S. PATENT DOCUMENTS

| | | |
|---|---|---|
| 6,624,941 B2 * | 9/2003 | Takeuchi et al. ............... 359/566 |
| 7,035,507 B2 * | 4/2006 | Hayashi ........................... 385/37 |
| 7,787,183 B2 * | 8/2010 | Te Kolste et al. ............. 359/569 |
| 2010/0284084 A1 * | 11/2010 | Ishibe ............................ 359/571 |
| 2010/0322060 A1 * | 12/2010 | Yasui ....................... 369/112.03 |
| 2012/0113518 A1 * | 5/2012 | Ando et al. .................... 359/571 |
| 2012/0152080 A1 * | 6/2012 | Sukegawa et al. ............... 83/875 |
| 2012/0156967 A1 * | 6/2012 | Sukegawa et al. ............... 451/28 |
| 2013/0089118 A1 * | 4/2013 | Kitamura et al. ............... 372/59 |
| 2014/0098656 A1 * | 4/2014 | Minami et al. ........... 369/112.07 |

FOREIGN PATENT DOCUMENTS

| | | |
|---|---|---|
| JP | 2003139929 A | 5/2003 |
| JP | 2006162822 A | 6/2006 |
| JP | 2010-286829 A | 12/2010 |

OTHER PUBLICATIONS

Office Action issued in JP2011-052933, mailed Aug. 4, 2015.

* cited by examiner

MANUFACTURING METHOD OF BLAZED DIFFRACTION GRATING AND MOLD FOR MAKING A BLAZED DIFRACTION GRATING

CROSS-REFERENCE TO RELATED APPLICATION

This application claims the benefit of Japanese Patent Application No. 2011-052933, filed Mar. 10, 2011 which is hereby incorporated by reference herein in its entirety.

BACKGROUND OF THE INVENTION

1. Field of the Invention

The present invention relates to a manufacturing method of a diffraction grating.

2. Description of the Related Art

A Blazed diffraction grating has a grating pattern having a sawtooth sectional shape, and each grating has a Blazed surface that receives incident light most and a counter surface neighboring the Blazed surface. It is important for a good optical characteristic to precisely form the Blazed surface that receives the incident light most. Japanese Patent Laid-Open No. 2010-286829 proposes cutting processing so as to simultaneously form both a Blazed surface of a certain grating and a counter surface of a neighboring grating.

Assume that each grating groove is formed by two-stage cutting processing so as to form the Blazed surface with higher surface accuracy. In this case, the first cutting processing provides cutting processing to a work using two blades of a cutting tool by moving the cutting tool. Next, the blade of the cutting tool used to form the counter surface is slightly moved towards the grating plane side along the cutting surface. The second cutting processing provides cutting processing at that position by moving the cutting tool. However, this two-stage cutting processing is likely to cause burrs or surface roughness.

SUMMARY OF THE INVENTION

The present invention provides a manufacturing method of a diffraction grating which can provide precisely cutting processing to a surface that receives incident light most.

According to the present invention, a method for manufacturing a Blazed diffraction grating having a plurality of grating grooves that extends in parallel in a direction includes a first cutting processing step of moving, in the direction, a work and a cutting tool having a first blade and a second blade relative to each other, and of forming a first surface of the grating groove in the work through cutting processing using the first blade of the cutting tool, and a second cutting step of moving, in the direction, the work and the cutting tool relative to each other after the first cutting processing step, so that the first blade does not contact the first surface formed by the first cutting processing step, forming a second surface, shorter than the first surface, of the grating groove in the work through cutting processing using the second blade of the cutting tool, and forming a step between the first surface and the second surface by cutting processing of the second surface using a blade of a cutting tool, wherein the step has a surface adjacent to the second surface, and an extension of the surface adjacent to the second surface does not cross the first surface.

Further features of the present invention will become apparent from the following description of exemplary embodiments with reference to the attached drawings.

DESCRIPTION OF THE EMBODIMENTS

Figure 1A:
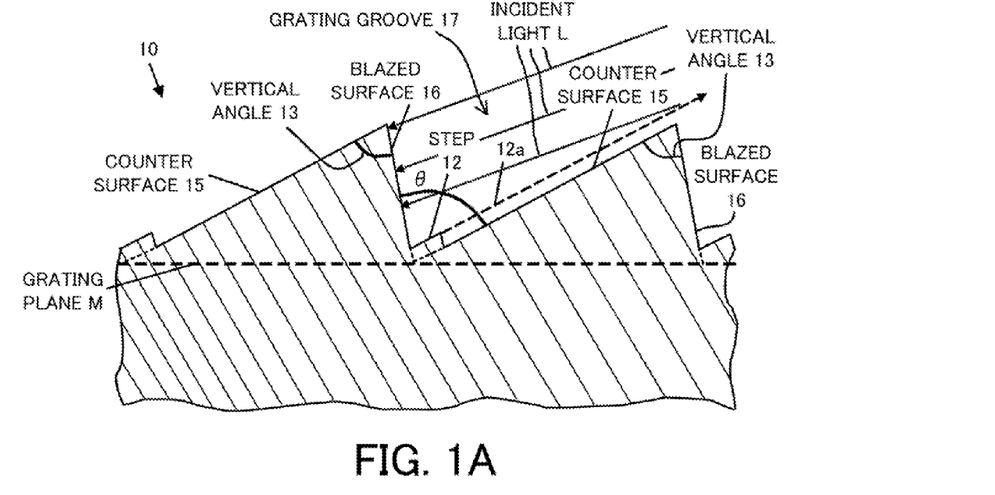
FIG. 1A is a partially enlarged sectional view of a diffraction grating of this embodiment.
Figure 1B:
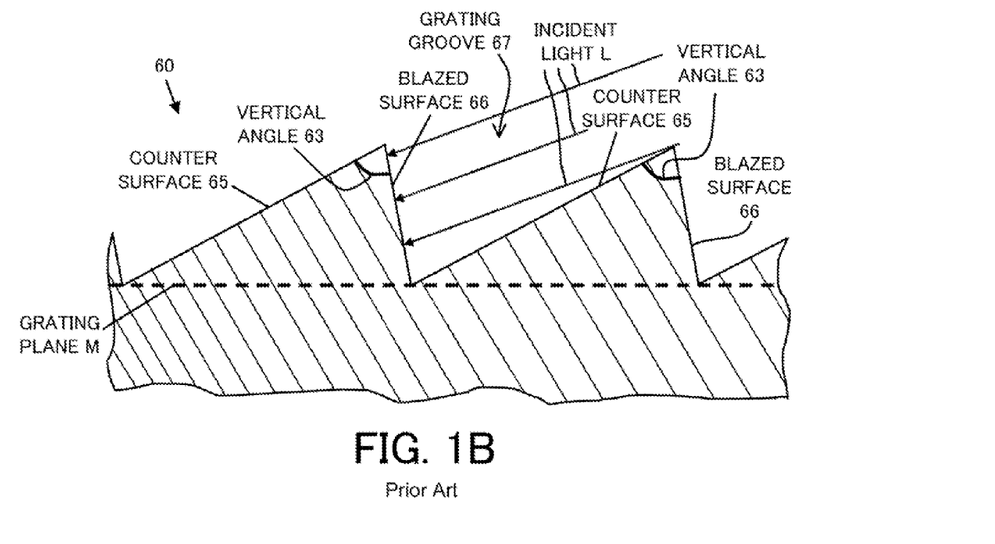
FIG. 1B is a partially enlarged sectional view of a conventional diffraction grating.

FIG. 1B is a partially enlarged sectional view of a conventional Echelle diffraction grating (Blazed diffraction grating) 60. The Blazed diffraction grating is a diffraction grating that has a high diffraction efficiency to a specific order and a wavelength, in which a plurality of grating grooves 67 extend in parallel in a direction perpendicular to the paper plane illustrated in FIG. 1B, and each grating has a sawtooth (Blazed) shape.

The paper plane illustrated in FIG. 1B is a plane parallel to a section that contains a Blazed direction (not illustrated) (which is a horizontal direction parallel to a grating plane M illustrated in FIG. 1B) and a grating normal (not illustrated) perpendicular to the Blazed direction.

Each grating of the Echelle diffraction grating 60 has an asymmetrical triangular shape that contains a short side and a long side, which extend in the direction perpendicular to the paper plane illustrated in FIG. 1B. An angle between the short side and the long side forms a vertical angle 63, and the Echelle diffraction grating 60 includes a Blazed surface 66 that receives the incident light most and a counter surface 65 neighboring the Blazed surface 66. The counter surface 65 crosses the Blazed surface 66 around the vertical angle 63, and a nodal line is the outermost ridgeline that is most distant from the grating plane M.

In order to divide incident light L that is incident in an arrow direction illustrated in FIG. 1B into more light fluxes, the Echelle diffraction grating 60 is likely to arranged, when it is used, so that the short side faces the incident light L direction, and the diffraction efficiency depends upon the surface accuracy (surface roughness) of the Blazed surface 66. Accordingly, highly precise cutting processing for the Blazed surface 66 is demanded.

FIG. 1A is a partially enlarged sectional view of the diffraction grating 10 of this embodiment. The diffraction grating 10 is different from the Echelle diffraction grating 60 in that the diffraction grating 10 has a step 12 at a bottom of the grating groove 17 between a counter surface 15 corresponding to the counter surface 65 and a Blazed surface 16 corresponding to the Blazed surface 66. When the counter surface 15 and the Blazed surface 16 which forms the step 12 between them are assumed, an extension 12a (illustrated by a dotted line) of a plane of the step 12 which crosses the Blazed surface 66 does not contact the counter surface 15. In addition, the Blazed surface 16 has a higher surface accuracy than that of the Blazed surface 66 due to the manufacturing method of this embodiment, which will be described later. The step 12 of this embodiment has, but is not limited to, a sawtooth shape.

The diffraction grating 10 acts like the Echelle diffraction grating 60. In other words, the diffraction grating 10 is a diffraction grating that has a plurality of grating grooves 17 that extends in parallel in the first direction perpendicular to the paper plane illustrated in FIG. 1A. The diffraction grating 10 exhibits high diffraction efficiency to a specific order and a specific wavelength. The number of grating grooves 17 of this embodiment is 0.077 to 0.143 per one micrometer, for instance.

Except for the step 12, each grating of the diffraction grating 10 has an asymmetrical triangular shape that contains the short side and the long side, and the short side and the long side extend in the direction perpendicular to the paper plane of FIG. 1A. An angle between the short side and the long side forms a vertical angle 13, which is, but not limited to, 75° to 95° in this embodiment. The diffraction grating 10 has a counter surface (first surface) 15 having the long side and a Blazed surface (second surface) 16 and the short side on a section illustrated in FIG. 1A or the paper plane. The diffraction grating 10 of this embodiment is a reflective diffraction element but may be a transmissive diffraction element (of a back surface reflecting type).

In the diffraction grating 10, a specific high propagating diffraction order in laser light is Blazed for each wavelength, and this Blazed order is higher than a $50^{th}$ order. When the laser light is emitted from an ArF excimer laser, the Blazed order is higher than a $90^{th}$ order, and when the laser light is emitted from a KrF excimer laser, the Blazed order is higher than a $60^{th}$ order.

Figure 2:
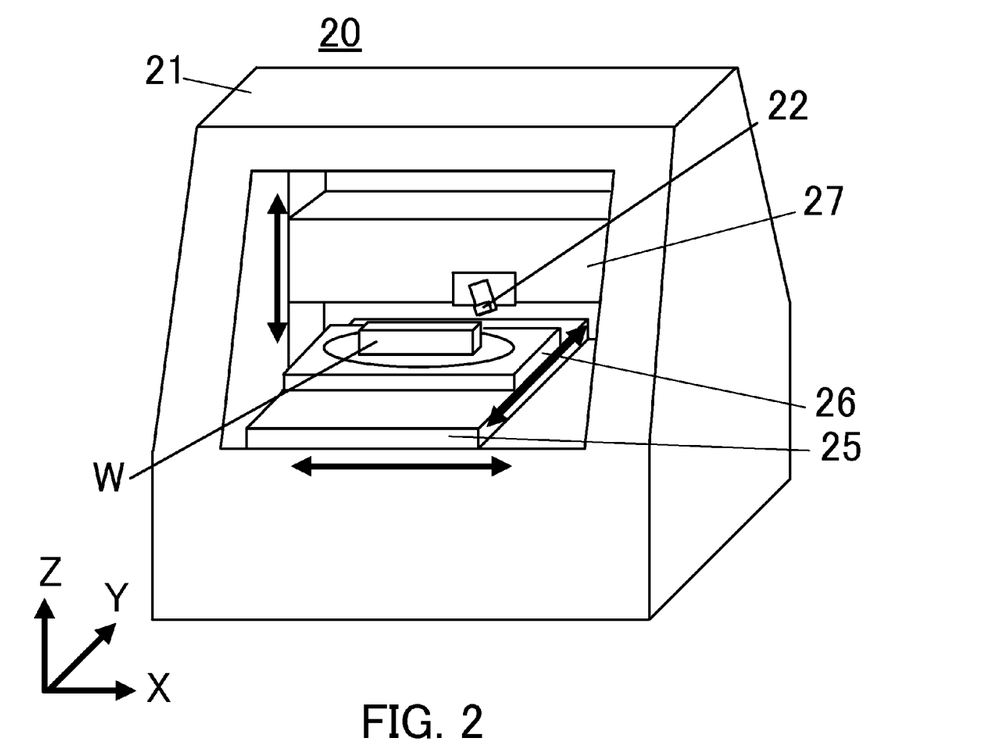
FIG. 2 is a schematic perspective view of a processing machine of this embodiment.

FIG. 2 is a schematic perspective view of the processing machine 20 of this embodiment, in which XYZ are set to orthogonal three-axis directions. The processing machine 20 is a manufacturing machine configured to manufacture the diffraction grating 10 by forming a plurality of grating grooves 17 in a work W.

The processing machine 20 is a numerically controllable superfine cutting processing machine with a depth of cut of an order of dozens of nanometers. The processing machine 20 includes a diamond cutting tool 22 that has a sharp tip, provides a highly precise processing transfer characteristic, and forms a grating groove 17 using the Shaper method. The work W includes a processed layer that contains copper, aluminum, or electroless nickel because these materials exhibit excellent cuttability by the diamond cutting tool 22. The material of the cutting tool and the material of the work W are not limited to the above materials.

The processing machine 20 mounts the work W on an XY stage that includes an X stage 25 that is movable in the X direction and a Y stage 26 that is movable in the Y direction in a highly rigid housing 21 that endures external vibrations. The diamond cutting tool 22 is mounted on a Z stage 27 that is movable in the Z direction. While the diamond cutting tool 22 of this embodiment is not rotatable, a processing machine may have a rotatable diamond cutting tool 22.

Figure 3A:
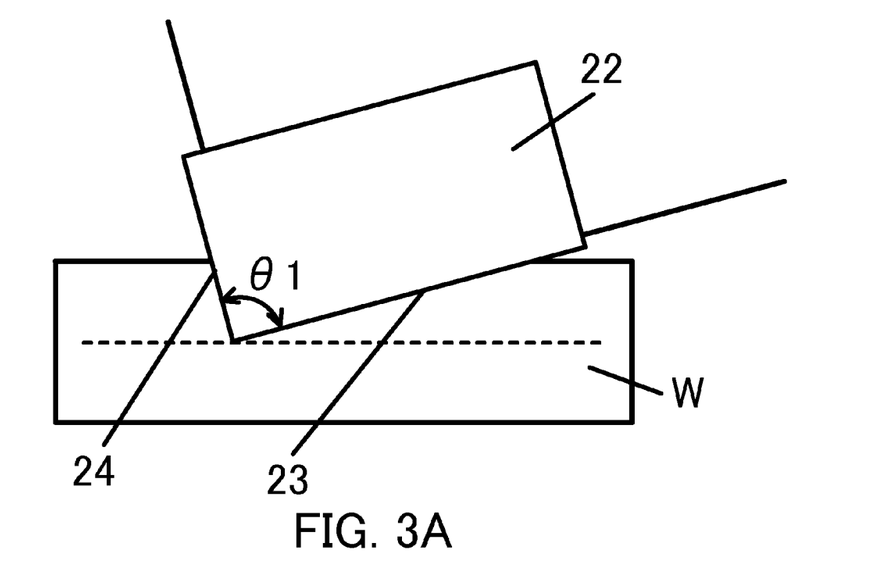
FIGS. 3A-3B are schematic views for explaining usage of a cutting tool of the processing machine illustrated in FIG. 2.

FIG. 3A is a schematic sectional view of the diamond cutting tool 22 in the cutting processing. The diamond cutting tool 22 includes at least two blades 23, 24 configured to transfer a polygonal groove sectional shape that serves as the grating groove 17. The blade is a first blade configured to form the counter surface 15 as a first surface, and the blade 24 is a second blade configured to form the Blazed surface 16 as a second surface.

An angle $\theta 1$ between the blades 23 and 24 is approximately equal to an open angle $\theta$ of the grating groove 17, which is 85° in this embodiment. Each tip of the blades 23 and 24 is made as sharp as possible, the linearity precision of the ridgeline at the tip is very high, and the wall-surface precision of each grating groove in the diffraction grating 10 can be maintained high. The nodal line between the counter surface 15 and the Blazed surface 16 of each grating constitutes the outermost ridgeline of the diffraction grating 10.

While the diamond cutting tool 22 opposes to the work W, the diamond cutting tool 22 is fallen by a depth of cut in the Z direction, such as 5 μm, to the work side and the XY stage is moved curvedly or linearly in the X or Y direction. The cutting speed relies upon the relative movement between the diamond cutting tool 22 and the work W, and the work W is cut by the blades 23 and 24.

Whether an object to be moved in the machining is the cutting tool or the work does not a matter. In order to avoid the overload of the cutting tool, a necessary cutting amount in the Z direction may be divided and the step of forming the divided cutting amount may be repeated several times. In the processing, oil mist is jetted from the backside of the tool rake surface so as to smoothly flow swarfs and to remove the process heat.

Figure 3B:
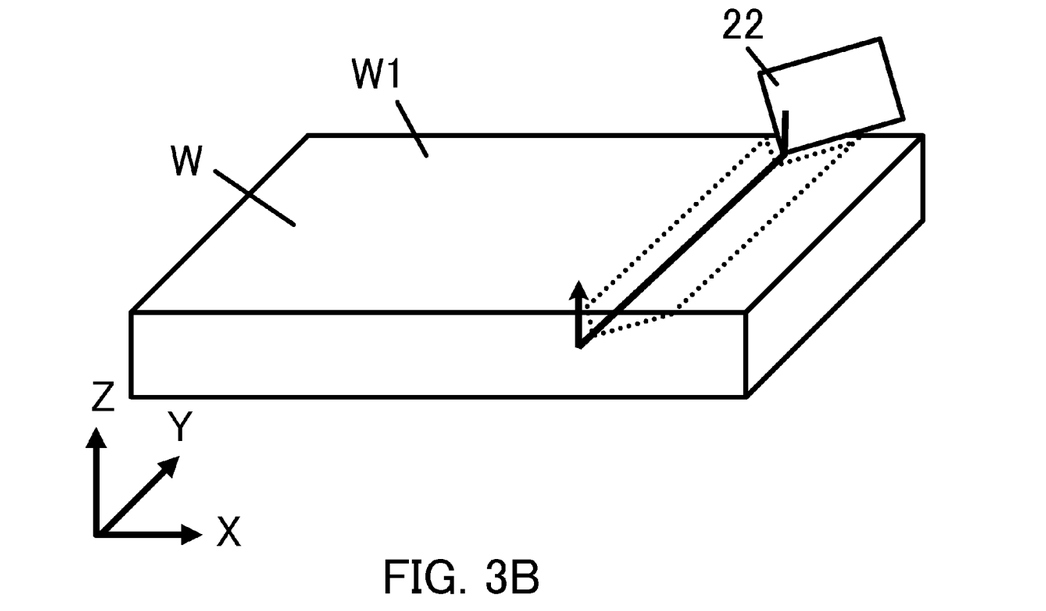

According to the cutting processing of this embodiment, as illustrated in FIG. 3B, the diamond cutting tool 22 is moved and positioned in the −X direction, and then linearly moved in the +Y direction. Thereby, a target surface W1 of the work W is cut. At this time, each cutting processing ends when a predetermined length, such as 30 mm in the Y direction (first direction) is cut at a predetermined X coordinate after the diamond cutting tool 22 is positioned to that position in the X axis.

Next follows a description of the manufacturing method of the diffraction grating 10 of this embodiment.

First Embodiment

Figure 4:
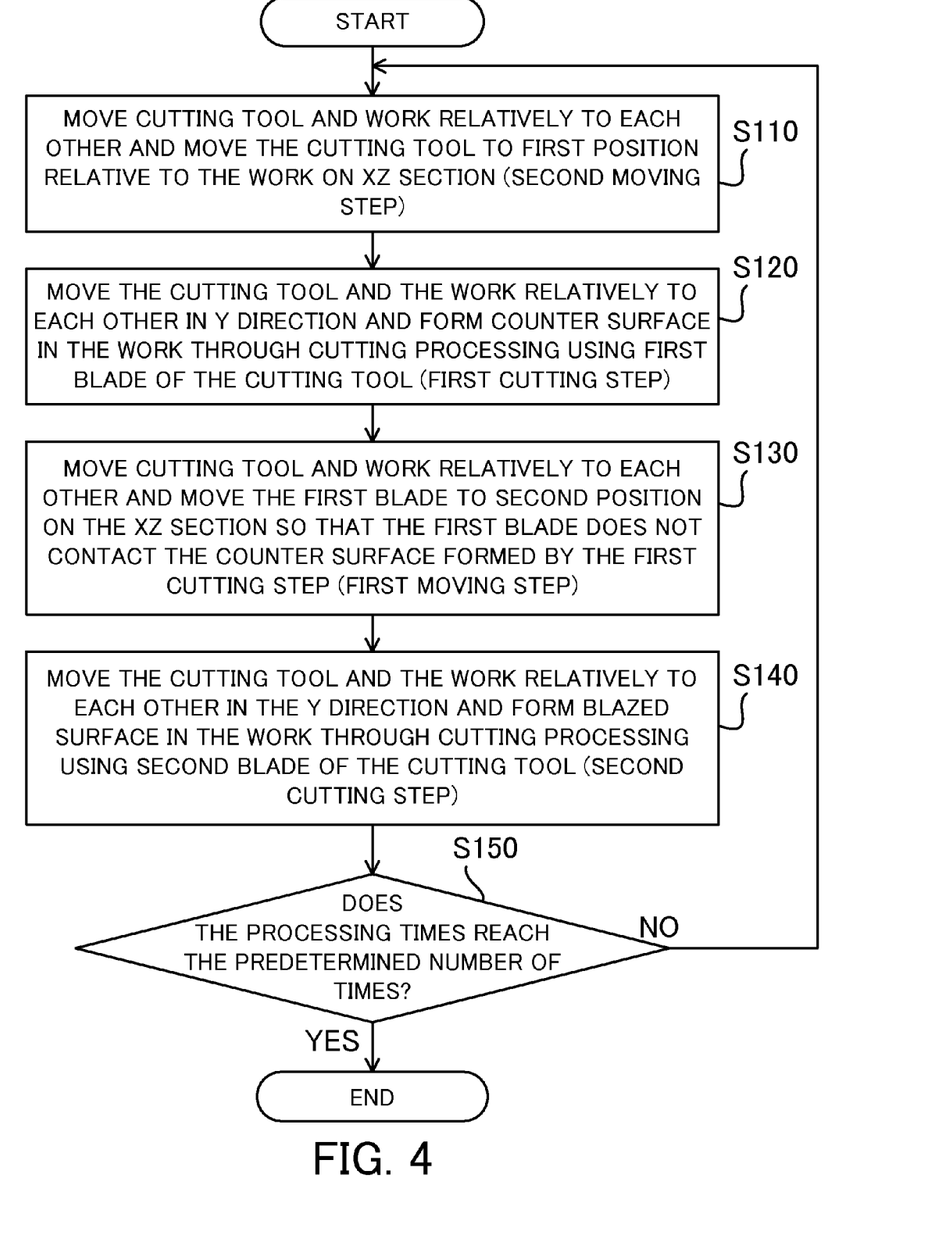
FIG. 4 is a flowchart for explaining a manufacturing method for manufacturing the diffraction grating illustrated in FIG. 1A according to a first embodiment.

In the first embodiment, the work W is made of a material of the diffraction grating 10, such as a crystal material. FIG. 4 is a flowchart for explaining the manufacturing method of the diffraction grating, and "S" stands for the "step." FIGS. 5A-5D are schematic sectional views of the work W in each step in FIG. 4.

Initially, the work W illustrated in FIG. 3B is prepared. The work W is made by cutting crystal manufactured by a crystal manufacturing apparatus into a proper shape, such as a rectangular parallelepiped shape illustrated in FIG. 3B, and by polishing the target surface W1 illustrated in FIG. 3B. If necessary, the work W may be attached to a jig.

Figure 5A:
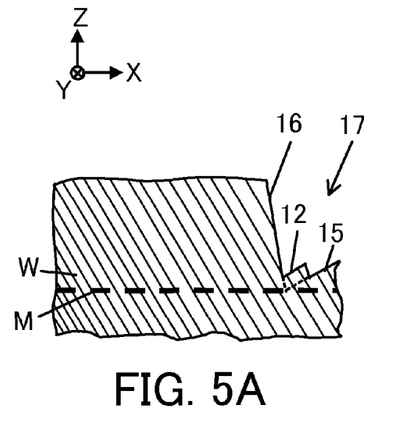
FIGS. 5A-5D are sectional views of a work for each step illustrated in FIG. 4 according to the first embodiment.

FIG. 5A is a sectional view illustrating the work W just before the next grating groove 17 is formed and after the grating groove 17 is formed by the previous cutting processing. M denotes a grating plane.

Then, the diamond cutting tool 22 and the work W are moved relatively to each other via the X stage 25, the Y stage 26, and the Z stage 27, and the diamond cutting tool 22 is moved to a first position relative to the work W on the XZ section (second moving step) (S110).

Figure 5B:
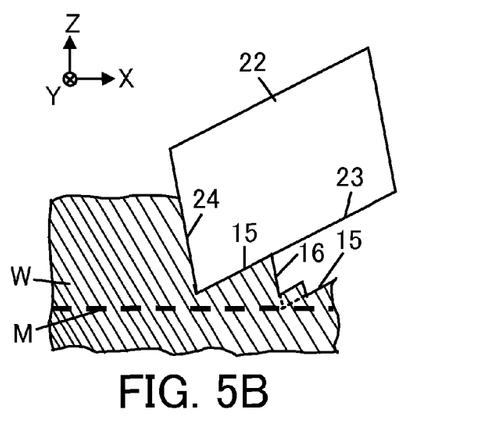

FIG. 5B illustrates the first position of the diamond cutting tool 22. The first position on the XZ section is a position to which the diamond cutting tool is moved from the position of the diamond cutting tool 22 in the previous first cutting processing step in the −X direction (grating pattern direction) by a repetitive width of the grating groove 17, such as 10 μm.

At that time, a rotating angle of the diamond cutting tool 22 is set on the XZ plane so that the blade 23 inclines to the grating plane M by a predetermined angle, such as 10°. With this tool angle, a depth of cut in the Z direction is determined so that the blade 23 can contact the work W with a predetermined length, such as 9 μm.

Next, the diamond cutting tool 22 and the work W are moved relatively to each other via the Y stage 26, and the counter surface (first surface) 15 is formed in the work W through cutting processing using the blade 23 of the diamond cutting tool 22 (first cutting processing step) (S120).

Figure 5C:
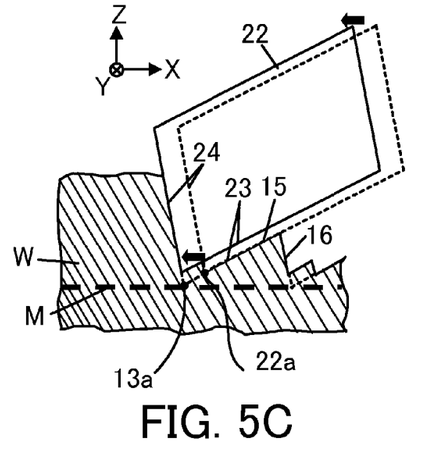

Next, after S120 (first cutting processing step), the diamond cutting tool 22 and the work W are moved relatively to each other so as to move the diamond cutting tool 22 to a second position relative to the work W on the XZ section (first moving step) (S130). In FIG. 5C, a dotted line denotes the first position and a solid line denotes the second position. As illustrated in FIG. 5C, at the second position, the blade 23 does not contact the counter surface 15 formed by the first cutting processing step.

For example, S130 moves the diamond cutting tool 22 to the second position from the first position of S120 by 1.17 μm in the −X direction. In addition, similar to the previous processing, the tool rotating angle to the XY plane in the positioning is adjusted so that the blade 23 inclines to the grating plane M by the predetermined angle, such as 10°.

Next, the diamond cutting tool 22 and the work W are moved relatively to each other and the Blazed surface 16 is formed in the work W through cutting processing using the blade 24 of the diamond cutting tool 22 (second cutting processing step) (S140).

According to the conventional two-stage cutting processing prior to the improvement of this embodiment, the cutting tool is moved in S130 after S110 and S120 from the first position illustrated by the dotted line in FIG. 5C toward the grating plane M along the counter surface 15. Then, a tip 22a between the cutting blades 23 and 24 reaches a nodal point 13a in the step 12 formed between an extension of the counter surface 15 and an extension of the Blazed surface 16. As a result, the step 12 is cut away.

When S140 is performed at this position, the blade 23 rubs the counter surface 15, and causes burrs at the top of the neighboring Blazed surface 16 on the right side in FIG. 5C (or the Blazed surface 66 illustrated in FIG. 1B). In addition, since the blade contacts and moves on the counter surface 15, the cutting tool vibrates when it moves in the Y direction and the vibration transmits to the blade 24 and the surface accuracy of the Blazed surface 66 lowers.

On the other hand, according to this embodiment, the first moving step (S130) moves the cutting tool and the work W relatively to each other so that the blade 23 does not contact the counter surface 15 formed in the first cutting processing step (S120). Therefore, the blade 23 does not rub the counter surface 15 in S140 or does not cause burrs at the top of the Blazed surface 16. The length by which the blade 23 contacts the step 12 of the work W is smaller than the length of the side of the counter surface 15, and the vibration of the blade 23 is restrained. Thus, the surface accuracy of the Blazed surface 16 is higher than that of the Blazed surface 66.

Each moving amount of this embodiment is not limited, and a rotating angle in the X, Z directions or relative to the XZ plane can be arbitrarily set as long as a blade other than the blade 23 does not contact another neighboring Blazed surface which is required to be flat for a high efficiency.

Until a pair of the first cutting processing step (S120) and the second cutting processing step (S140) is repeated the predetermined number of times, such as 20,000 times (No of S150), the flow returns to S110.

As a result, the diamond cutting tool 22 and the work W are moved relatively to each other after the second cutting processing step (S140), and the diamond cutting tool 22 is moved to the first position on the XZ section relative to the grating plane M. As described above, the first position on the XZ section at this time is a position to which the diamond cutting tool 22 is moved from the position of the previous first cutting processing step in the −X direction (grating pattern direction) by a repetitive width of the grating groove 17.

Figure 5D:
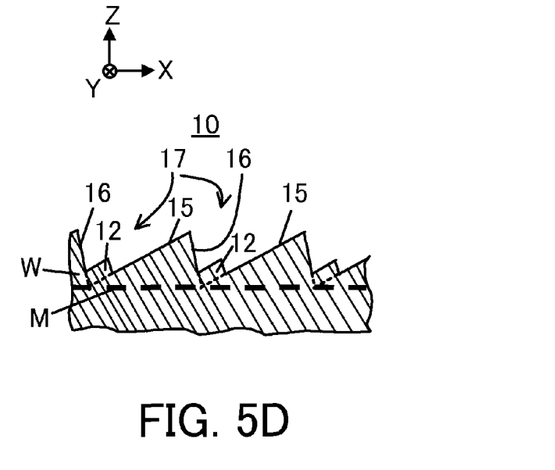

When the pair of the first cutting processing step (S120) and the second cutting processing step (S140) is repeated the predetermined number of times (Yes of S150), the flow ends. Thereby, the diffraction grating 10 is produced as illustrated in FIG. 5D.

In addition, the first moving step (S130) moves the diamond cutting tool 22 so that the incident light L enters the Blazed surface 16 but does not reach the step 12 when the diffraction grating 10 is used as illustrated in FIG. 1A. Thereby, a drop of the diffraction efficiency of the Blazed surface 16 caused by the step 12 can be restrained.

Second Embodiment

This embodiment makes the work W of a material of a mold, such as a metallic material, and the manufacturing method of the diffraction grating further includes the step of molding the diffraction grating utilizing this mold. More specifically, the molding step forms the diffraction grating that has an inverted grating pattern to that of the mold through injection molding in which a material of the diffraction grating, such as resin, is filled in the mold. The diffraction grating in this case has a cut shape (corresponding to the step 12) at a portion corresponding to the vertical angle 13, and no step is formed between the counter surface and the Blazed surface in each grating groove.

Third Embodiment

This embodiment makes the work W of a material of a mold, such as a metallic material, and the manufacturing method of the diffraction grating further includes the step of forming the (reflective) diffraction grating by coating the work W with aluminum. Moreover, a protective film, such as a single layer film or multilayer film of a dielectric film, may be formed on the reflective film. The dielectric film may be an $Al_2O_3$ film, a $LaF_3$ film, an $MgF_2$ film, and an $AlF_3$ film.

Fourth Embodiment

Figure 6:
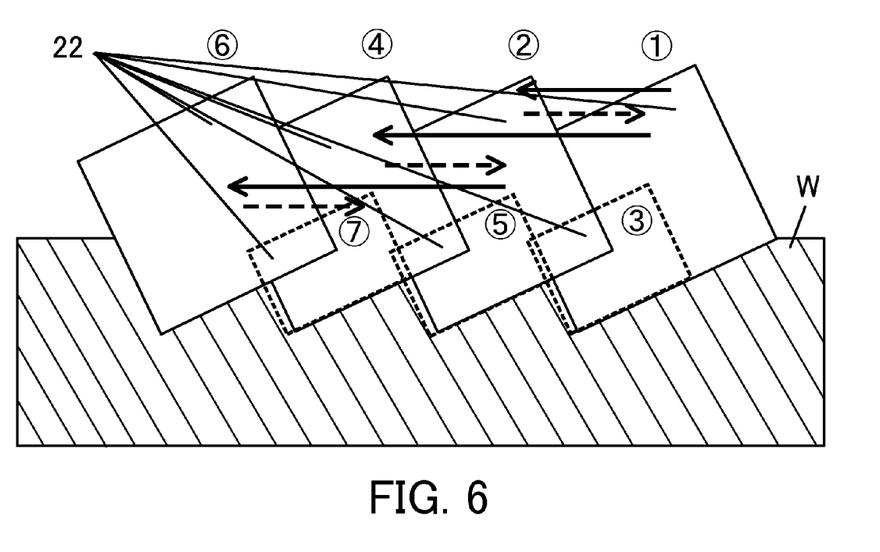
FIG. 6 is a sectional view for explaining another manufacturing method according to a fourth embodiment.

The manufacturing method of this embodiment is not limited to those illustrated in FIGS. 4 and 5A-5D. For example, after the processing illustrated in FIG. 5B is performed for a first grating groove, the processing illustrated in FIG. 5B is performed for a neighboring second grating groove instead of performing the processing illustrated in FIG. 5C for the first grating groove. Next, the processing illustrated in FIG. 5C is performed for the first grating groove, the processing illustrated in FIG. 5B is performed for the third grating groove, the processing illustrated in FIG. 5C is performed for the second grating groove, and the processing illustrated in FIG. 5B is performed for the fourth grating groove. Next, the processing illustrated in FIG. 5C is performed for the third grating groove. FIG. 6 illustrates this sequence. Arrows and ordering numbers in FIG. 6 illustrate the sequence.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A diffraction grating having a plurality of gratings, the diffraction grating comprising:
   a first surface; and
   a second surface shorter than the first surface in a cross section, wherein the grating is a Blazed type,
wherein a protruded step is formed between two adjacent gratings,
wherein the protruded step has a surface adjacent to the second surface,
wherein the surface adjacent to the second surface of the protruded step is shorter than the second surface in the cross section,
wherein an extension of the surface adjacent to the second surface of the protruded step does not cross the first surface,
wherein the plurality of gratings generate a diffracted light by diffracting an incident light having a predetermined incident angle to the plurality of gratings from a blazed direction of the diffraction grating, and
wherein the protruded step is shaped so that the incident light having the predetermined incident angle does not reach the protruded step and does not generate the diffracted light.

2. A diffraction method using a diffraction grating having a plurality of gratings, the method comprising:
making light incident to the plurality of gratings; and
diffracting the incident light by the plurality of gratings,
wherein the diffraction grating comprises
a first surface; and
a second surface shorter than the first surface in a cross section,
wherein the grating is a Blazed type,
wherein a protruded step is formed between two adjacent gratings,
wherein the protruded step has a surface adjacent to the second surface,
wherein the surface adjacent to the second surface of the protruded step is shorter than the second surface in the cross section,
wherein an extension of the surface adjacent to the second surface of the protruded step does not cross the first surface,
wherein, in the diffracting, the plurality of gratings generate a diffracted light by diffracting the incident light on a predetermined incident angle to the plurality of gratings from a blazed direction of the diffraction grating, and
wherein the protruded step is shaped so that the incident light having the predetermined incident angle does not reach the protruded step and does not generate the diffracted light.

3. The diffraction grating according to claim 1, wherein the diffraction grating is an Echelle diffraction grating.

4. The diffraction grating according to claim 1, wherein a specific high propagating diffraction order in laser light is Blazed for each wavelength, and a Blazed order is higher than a $50^{th}$ order.

5. The diffraction grating according to claim 1,
wherein the step is formed by, after forming the first surface through cutting processing using a blade of a cutting tool, forming the second surface through cutting processing using a blade of the cutting tool so that the cutting tool does not contact the first surface.

6. The diffraction grating according to claim 1,
wherein the step is formed by, after forming the first surface through cutting processing using a first blade of a cutting tool having the first blade and a second blade, forming the second surface through cutting processing using the second blade of the cutting tool so that the first blade does not contact the first surface.

7. The diffraction grating according to claim 1,
wherein the incident light on the second surface of the grating is diffracted.

8. The diffraction grating according to claim 1,
wherein the protruded step is formed by cutting processing of the second surface using a blade of a cutting tool.

9. The diffraction grating according to claim 4, wherein the laser light is emitted from an ArF excimer laser, and the Blazed order is higher than a $90^{h}$ order.

10. The diffraction grating according to claim 4, wherein the laser light is emitted from a KrF excimer laser, and the Blazed order is higher than a $60^{h}$ order.

* * * * *